US008643658B2

(12) United States Patent
Kwa et al.

(10) Patent No.: US 8,643,658 B2
(45) Date of Patent: Feb. 4, 2014

(54) TECHNIQUES FOR ALIGNING FRAME DATA

(75) Inventors: Seh Kwa, San Jose, CA (US); Maximino Vasquez, Fremont, CA (US); Ravi Ranganathan, San Jose, CA (US); Todd M. Witter, Orangevale, CA (US); Kyungtae Han, Portland, OR (US); Paul S. Diefenbaugh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 555 days.

(21) Appl. No.: 12/655,389

(22) Filed: Dec. 30, 2009

(65) Prior Publication Data

US 2011/0157202 A1 Jun. 30, 2011

(51) Int. Cl.
*G06T 1/00* (2006.01)

(52) U.S. Cl.
USPC ............................ 345/522; 345/530; 345/534

(58) Field of Classification Search
USPC ............................ 345/87, 441, 501; 386/231
See application file for complete search history.

(56) References Cited

U.S. PATENT DOCUMENTS 5,027,212 A 6/1991 Marlton et al.
5,909,225 A 6/1999 Schinnerer et al.
5,919,263 A 7/1999 Kikinis et al.
5,963,200 A 10/1999 Deering et al.
6,166,748 A 12/2000 Van Hook et al.
6,657,634 B1 12/2003 Sinclair et al.
6,909,434 B2 6/2005 Takal et al.
6,966,009 B1 * 11/2005 Boduch ......................... 713/500
6,967,659 B1 11/2005 Jayavant et al.
7,017,053 B2 3/2006 Mizuyabu et al.
7,268,755 B2 * 9/2007 Selwan .......................... 345/87
7,397,478 B2 7/2008 Jiang
7,535,478 B2 5/2009 Dunton et al.
7,558,264 B1 7/2009 Lolayekar et al.
7,839,860 B2 11/2010 Kobayashi
7,864,695 B2 1/2011 Morinaga et al.
2003/0227460 A1 * 12/2003 Schinnerer .................... 345/539
2004/0189570 A1 9/2004 Selwan (Continued)

FOREIGN PATENT DOCUMENTS

CN 1728765 A 2/2006
CN 1816844 A 8/2006

(Continued)

OTHER PUBLICATIONS

Office Action received in Korean Patent Application No. 2010-0134783, mailed Jun. 17, 2012, 2 pages of English translation only.

(Continued)

*Primary Examiner* — Phi Hoang
(74) *Attorney, Agent, or Firm* — Glen B Choi

(57) ABSTRACT

Techniques are described that can used to synchronize the start of frames from multiple sources so that when a display is to output a frame to a next source, boundaries of current and next source are aligned. Techniques attempt to avoid visible glitches when switching from displaying a frame from a first source to displaying frames from a second source even though alignment is achieved by switching if frames that are to be displayed from the second source are similar to those displayed from the first source.

18 Claims, 10 Drawing Sheets

(56) References Cited

U.S. PATENT DOCUMENTS

| | | | | |
|---|---|---|---|---|
| 2004/0233226 | A1 | 11/2004 | Toriumi et al. | |
| 2007/0091359 | A1 | 4/2007 | Suzuki et al. | |
| 2007/0150616 | A1 | 6/2007 | Baek et al. | |
| 2007/0242011 | A1 | 10/2007 | Kita | |
| 2007/0291037 | A1* | 12/2007 | Blaukopf et al. | 345/441 |
| 2008/0008172 | A1 | 1/2008 | Kobayashi | |
| 2008/0036748 | A1 | 2/2008 | Less | |
| 2008/0055318 | A1* | 3/2008 | Glen | 345/501 |
| 2008/0143695 | A1 | 6/2008 | Juenemann et al. | |
| 2008/0168285 | A1 | 7/2008 | De Cesare et al. | |
| 2008/0180432 | A1* | 7/2008 | Lee | 345/214 |
| 2009/0079746 | A1* | 3/2009 | Howard et al. | 345/502 |
| 2009/0125940 | A1 | 5/2009 | Kim et al. | |
| 2009/0158377 | A1 | 6/2009 | Diab et al. | |
| 2009/0162029 | A1* | 6/2009 | Glen | 386/231 |
| 2010/0087932 | A1 | 4/2010 | Mccoy et al. | |
| 2010/0319037 | A1 | 12/2010 | Kim et al. | |

FOREIGN PATENT DOCUMENTS

| | | | |
|---|---|---|---|
| CN | 101454823 | A | 6/2009 |
| CN | 101491090 | A | 7/2009 |
| JP | 2001-016221 | A | 1/2001 |
| JP | 2001-016222 | A | 1/2001 |
| JP | 2005-027120 | A | 1/2005 |
| JP | 2006-268738 | A | 10/2006 |
| JP | 2008-084366 | A | 4/2008 |
| JP | 2008-109269 | A | 5/2008 |
| JP | 2008-182524 | A | 8/2008 |
| KR | 2008-0039532 | A | 5/2008 |
| KR | 2008-0091843 | A | 10/2008 |
| TW | 243523 | | 3/1995 |
| TW | 200746782 | A | 12/2007 |

OTHER PUBLICATIONS

Office Action received in Chinese Patent Application No. 201010622960.3, mailed Jul. 12, 2013, 3 pages of Chinese Office Action and 5 pages of English translation.

Office Action received in Chinese Patent Application No. 201010622960.3, mailed Jan. 6, 2013, 5 pages of Chinese Office Action and 8 pages of English translation.

Office Action received in Chinese Patent Application No. 200910222296.0, mailed Sep. 28, 2011, 17 pages of Office Action including 8 pages off English translation.

Vesa Display Port Standard, Video Electronics Standards Association, "Section 2.2.5.4 Extension Packet", Version 1, Revision 1a, Jan. 11, 2008, pp. 1 and 81-83.

"Industry Standard Panels for Monitors-15.0-inch (ISP 15-inch)", Mounting and Top Level Interface Requirements, Panel Standardization Working Group, version 1.1, Mar. 12, 2003, pp. 1-19.

Office Action received in Chinese Patent Application No. 200910222296.0, mailed Jun. 20, 2012, 11 pages of Office Action including 6 pages of English translation.

Office Action Received for Korean Patent Application No. 10-2009-111387 mailed on Jan. 30, 2012, 8 pages of Office Action including 4 pages of English Translation.

Office Action received for Korean Patent Application No. 10-2009-111387, mailed on Mar. 9, 2011, 9 pages of Office Action including 4 pages of English Translation.

"VESA Embedded Display Port Standard", Video Electronics Standards Association (VESA), Version 1.3, Jan. 13, 2011, pp. 1-81.

Office Action received for Korean Patent Application No. 10-2009-92283, mailed on Feb. 12, 2011, 4 pages of Office Action including 1 page of English Translation.

Office Action received in Korean Patent Application No. 2010-0133848, mailed Jul. 3, 2012, 1 page of English translation only.

Office Action received in U.S. Appl. No. 12/286,192, mailed Apr. 29, 2010, 7 page of Office Action.

Office Action received in U.S. Appl. No. 12/313,257, mailed Sep. 29, 2011, 9 page of Office Action.

Office Action received in U.S. Appl. No. 12/313,257, mailed Mar. 14, 2012, 9 page of Office Action.

Office Action received in Taiwanese Patent Application No. 099143485, mailed Jun. 7, 2013, 16 pages of Office Action, including 6 pages of English translation.

Office Action received for Chinese Patent Application No. 200910221453.6, mailed on Oct. 10, 2011, 8 pages of Chinese Office Action including 4 pages of English Translation.

Office Action received for U.S. Appl. No. 12/655,410, mailed on Jun. 12, 2013, 30 pages.

Office Action received in Chinese Patent Application No. 200910221453.6, mailed Jul. 23, 2012, 5 pages of Office Action, including 2 pages of English translation.

Office Action received for Korean Patent Application No. 10-2009-0092283, mailed on Oct. 27, 2011, 5 pages of Office Action including 2 pages of English translation.

Office Action received for Korean Patent Application No. 10-2009-0092283, mailed on Feb. 12, 2011, 5 pages of office action including 2 pages of English translation.

Office Action Received in Korean Patent Application No. 10-2009-0092283, mailed Apr. 9, 2012, 8 pages of office action including 4 pages of English translation.

Office Action Received in Korean Patent Application No. 10-2009-0092283, mailed Oct. 31, 2012, 5 pages of office action including 2 pages of English translation.

Office Action received for Japanese Patent Application No. 10-2009-222990, mailed on Aug. 2, 2011, 4 pages of Japanese Office Action including 2 pages of English Translation.

Office Action received for Japanese Patent Application No. 2012-031772, mailed on May 14, 2013, 4 pages of Japanese Office Action including 2 pages of English Translation.

Office Action received in Taiwan Patent Application No. 98132686, mailed Dec. 26, 2012, 20 pages of Taiwanese Office Action including 4 page English translation of Office Action and 1 page of English Translation of Search Report.

Office Action received for U.S. Appl. No. 13/625,185, mailed on Feb. 21, 2013, 10 pages.

Office Action received in Chinese Patent Application No. 201010622967.5, mailed Jan. 31, 2013, 12 pages of Office Action including 7 pages of English translation.

"VESA Embedded DisplayPort (eDP)", VESA eDP Standard, Copyright 2008 Video Electronics Standards Association, Version 1, Dec. 22, 2008, pp. 1-23.

"VESA Embedded DisplayPort (eDP) Standard", Embedded DisplayPort, Copyright 2008-2009 Video Electronics Standards Association, Version 1.1, Oct. 23, 2009, pp. 1-32.

"VESA Embedded DisplayPort Standard", eDP Standard, Copyright 2008-2010 Video Electronics Standards Association, Version 1.2, May 5, 2010, pp. 1-53.

Search Report Received in Taiwanese Patent Application No. 098138973, mailed Feb. 25, 2013, 13 pages of Taiwanese Office Action including 3 page English translation of Office Action and 1 page of English Translation of Search Report.

Non-Final Office Action received in U.S. Appl. No. 13/089,731, mailed Jul. 22, 2011, 7 pages of Office Action.

Non-Final Office Action received in U.S. Appl. No. 13/349,276, mailed Jul. 2, 2012, 7 pages of Office Action.

Office Action received in Chinese Patent Application No. 200910222296.0, mailed Oct. 30, 2012, 7 pages of Office Action including 4 pages of English translation.

* cited by examiner

TECHNIQUES FOR ALIGNING FRAME DATA

RELATED APPLICATIONS

This application is related to U.S. patent applications having Ser. No. 12/286,192, entitled "PROTOCOL EXTENSIONS IN A DISPLAY PORT COMPATIBLE INTERFACE," filed Sep. 29, 2008, inventors Kwa, Vasquez, and Kardach, Ser. No. 12/313,257, entitled "TECHNIQUES TO CONTROL OF SELF REFRESH DISPLAY FUNCTIONALITY," filed Nov. 18, 2008, and Ser. No. 12/655,410, entitled "TECHNIQUES FOR ALIGNING FRAME DATA," filed Dec. 30, 2009, inventors Vasquez et al.

FIELD

The subject matter disclosed herein relates generally to display of images and more particularly to aligning data received from a graphics engine.

RELATED ART

Display devices such as liquid crystal displays (LCD) display images using a grid of row and columns of pixels. The display device receives electrical signals and displays pixel attributes at a location on the grid. Synchronizing the timing of the display device with the timing of the graphics engine that supplies signals for display is an important issue. Timing signals are generated to coordinate the timing of display of pixels on the grid with the timing of signals received from a graphics engine. For example, a vertical synch pulse (VSYNC) is used to synchronize the end of one screen refresh and the start of the next screen refresh. A horizontal synch pulse (HSYNC) is used to reset a column pointer to an edge of a display.

A frame buffer can be used in cases where the display is to render one or more frames from the frame buffer instead of from an external source such as a graphics engine. In some cases, a display switches from displaying frames from the frame buffer to displaying frames from the graphics engine. It is desirable that alignment between the frames from the graphics engine and the frames from the frame buffer take place prior to displaying frames from the graphics engine. In addition, it is desirable to avoid unwanted image defects such as artifacts or partial screen renderings when changing from displaying frames from the frame buffer to displaying frames from the graphics engine.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

When switching from outputting frames from a first source to outputting frames from a second source, the frames from the second source can be markedly different from those output from the first source. Various embodiments attempt to avoid visible glitches when switching from displaying a frame from a first source to displaying frames from a second source after alignment is achieved by switching if frames that are to be displayed from the second source are substantially similar to those displayed from the first source. For example, a first frame source can be a memory buffer and a second frame source can be a stream of frames from a video source such as a graphics engine or video camera. After timing alignment of a frame from the first source with a frame from the second source, a determination is made whether the second source has an updated image. If no updated image is available and timing alignment is present, frames from the second source are provided for display. Each frame of data represents a screen worth of pixels.

Figure 1:
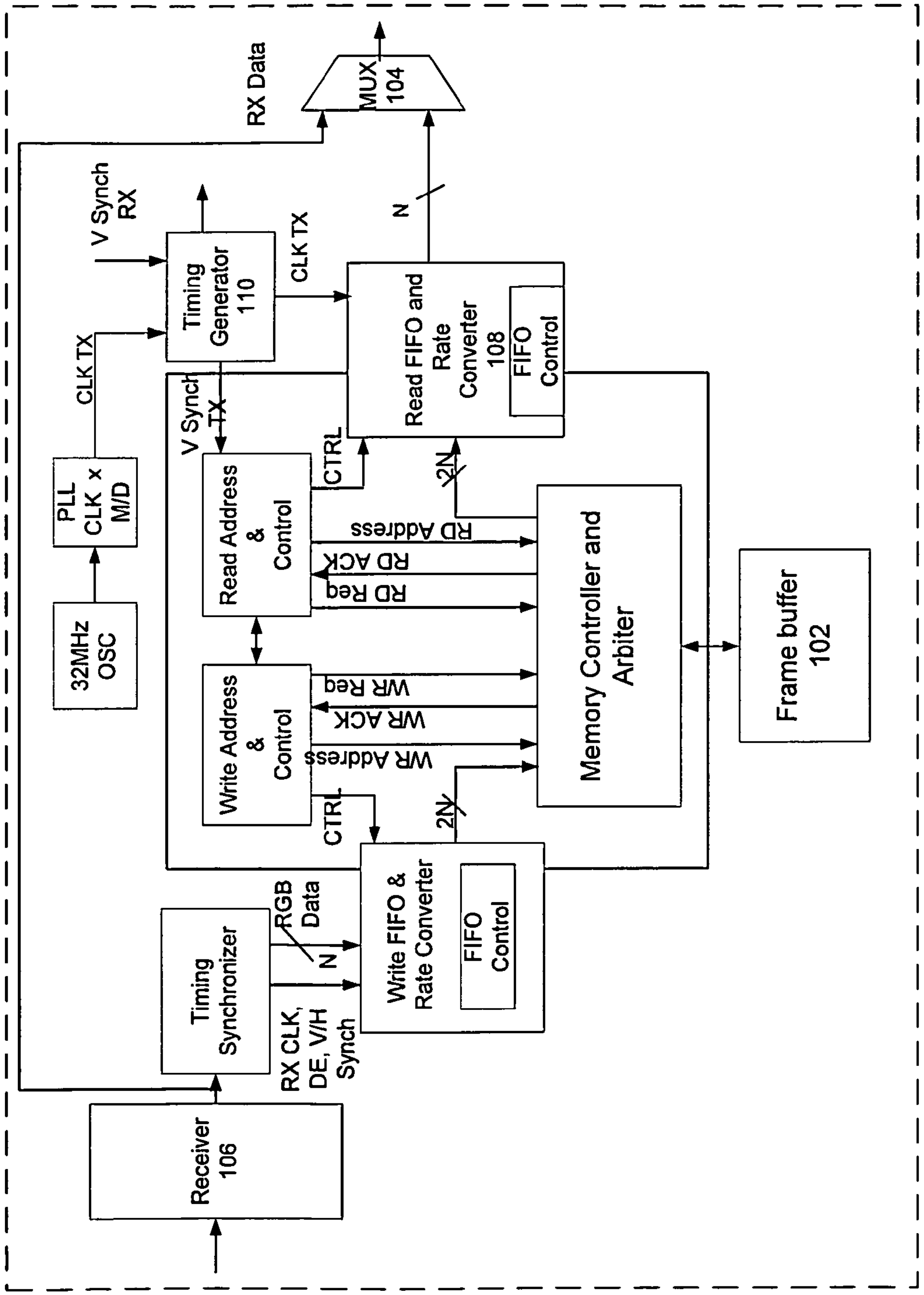
FIG. 1 is a block diagram of a system with a display that can switch between outputting frames from a display interface and a frame buffer.

FIG. 1 is a block diagram of a system with a display that can switch between outputting frames from a display interface and frames from a frame buffer. Frame buffer 102 can be a single port RAM but can be implemented as other types of memory. The frame buffer permits simultaneous reads and writes from the frame buffer. The reads and writes do not have to be simultaneous. A frame can be written while a frame is read. This can be time multiplexed, for instance.

Multiplexer (MUX) 104 provides an image from frame buffer 102 or a host device received through receiver 106 to a display (not depicted). Receiver 106 can be compatible with Video Electronics Standards Association (VESA) DisplayPort Standard, Version 1, Revision 1a (2008) and revisions thereof. Read FIFO and Rate Converter 108 provides image or video from frame buffer 102 to MUX 104. RX Data identifies data from a display interface (e.g., routed from a host graphics engine, chipset, or Platform Controller Hub (PCH) (not depicted)). Timing generator 110 controls whether MUX 104 outputs image or video from RX Data or from frame buffer 102.

When the system is in a low power state, the display interface is disabled and the display image is refreshed from the data in the frame buffer 102. When the images received from the display interface start changing or other conditions are met, the system enters a higher power state. In turn, the display interface is re-enabled and the display image is refreshed based on data from the display interface or other conditions exist where the display image is refreshed based on data from the display interface. MUX 104 selects between frame buffer 102 or the display interface to refresh the display. In order to allow this transition into and out of the low power state to occur at any time, it is desirable that the switch between frame buffer 102 and graphics engine driving the display via the display interface occur without any observable artifacts on the display. In order to reduce artifacts, it is desirable for frames from frame buffer 102 to be aligned with frames from the display interface. In addition, after alignment of a frame from frame buffer 102 with a frame from display interface, a determination is made whether the graphics engine has an updated image.

In various embodiments, a display engine, software, or a graphics display driver can determine when to permit display of a frame from a graphics engine instead of a frame a frame buffer. The graphics display driver configures the graphics engine, display resolution, and color mapping. An operating system can communicate with the graphics engine using the graphics driver.

Table 1 summarizes characteristics of various embodiments that can be used to change from a first frame source to a second frame source.

TABLE 1

| Option | Max Lock Time | Min Lock Time | Missed Frames | Comments |
|---|---|---|---|---|
| TCON Timing Lags | $V_T/N$ | 0 | 1 unless lock right away | |
| TCON Timing Leads | $V_T/N$ | 0 | 0 | Max N for lead is normally much less than for lag |
| Adaptive TCON Sync | $<V_T/N$ and $>=V_T/2N$ | 0 | 1 unless lock right away | Max Lock Time = $V_T/2N$ if N is the same for lag & lead. Otherwise Max Lock Time is greater |
| Continuous Capture | $V_T/N$ | 0 | 0 | Added power and 1 frame delay during bypass |
| TCON Reset | 0 | 0 | 0 | Lower part of display will have longer refresh than $V_T$ for one frame |
| Source Beacon | 0 | 0 | 0 | Extra power burned for beacon. |

$V_T$ indicates the source frame length in terms of line counts and N indicates a difference between vertical blanking regions of frames from the display interface and frames from the frame buffer in terms of line counts. $V_T$ can be expressed in terms of time.

In each case, the output from the MUX is switched approximately at alignment of the vertical blanking region of the frame from the frame buffer and a vertical blanking region of a frame from the graphics engine. Signal TCON_VDE represents vertical enabling of a display from the frame buffer of the display. When signal TCON_VDE is in an active state, data is available to display. But when signal TCON_VDE is in an inactive state, a vertical blanking region is occurring. Signal SOURCE_VDE represents vertical enabling of a display from a display interface. When signal SOURCE_VDE is in an active state, data from the display interface is available to display. When signal SOURCE_VDE is in an inactive state, a vertical blanking region is occurring for the frames from the display interface.

Signal SRD_ON going to an inactive state represents that the display is to be driven with data from the display interface beginning with the start of the next vertical active region on the display interface and frames from a graphics engine may be stored into a buffer and read out from the buffer for display until alignment has occurred. After alignment has occurred, frames are provided by the display interface directly for display instead of from the frame buffer.

When the MUX outputs frames from the display interface, the frame buffer can be powered down. For example, powering down frame buffer 102 can involve clock gating or power gating components of frame buffer 102 and other components such as the timing synchronizer, memory controller and arbiter, timing generator 110, write address and control, read address and control, write FIFO and rate converter, and read FIFO and rate converter 108.

Signal SRD_STATUS (not depicted) causes the output from the MUX to switch. When signal SRD_STATUS is in an active state, data is output from the frame buffer but when signal SRD_STATUS is in an inactive state, data from the display interface is output. Signal SRD_STATUS going to the inactive state indicates that alignment has occurred and the MUX can transfer the output video stream from the display interface instead of from the frame buffer.

TCON_VDE and SOURCE_VDE (not depicted) in an active state represent that a portion of a frame is available to be read from a frame buffer and display interface, respectively. Falling edges of TCON_VDE and SOURCE_VDE represent commencement of vertical blanking intervals for frames from a frame buffer and display interface, respectively. In various embodiments, signal SRD_STATUS transitions to an inactive state when the falling edge of SOURCE_VDE is within a time window, which is based on the ICON frame timing. An alternative embodiment would transition signal SRD_STATUS to an inactive state when a timing point based on the TCON frame timing falls within a window based on the SOURCE_VDE timing. The frame starting with the immediately next rising edge of signal SOURCE_VDE is output from the MUX for display.

For example, the window can become active after some delay from the falling edge of TCON_VDE that achieves the minimum vertical blank specification of the display not being violated for a TCON frame. The window can become inactive after some delay from becoming active that achieves the maximum vertical blank specification of the display not being violated for a TCON frame, while maintaining display quality, such as avoiding flicker. Depending on the embodiment, there may be other factors that establish a duration of the window, such as achieving a desired phase difference between TCON_VDE and SOURCE_VDE.

Figure 2:
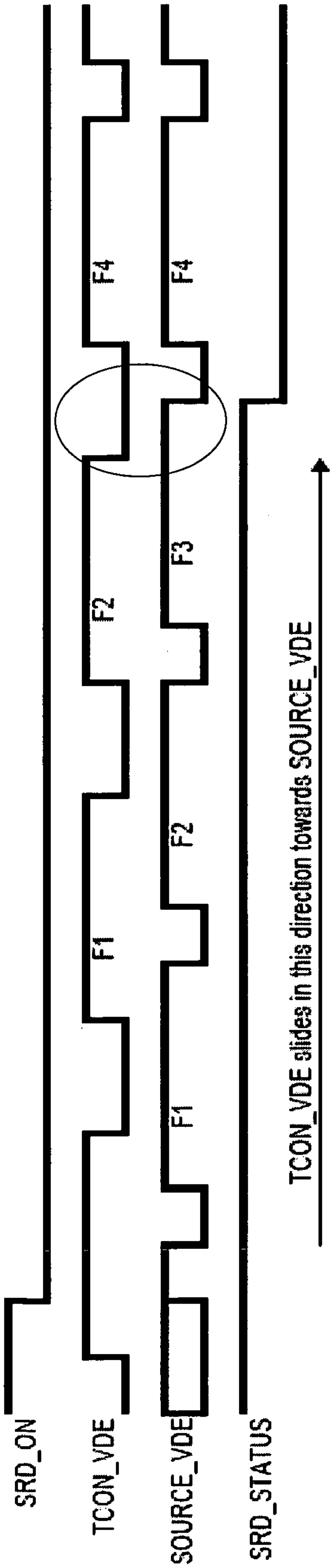
FIG. 2 depicts alignment of frames from a source with frames from a frame buffer where the frames from the frame buffer have a longer vertical blanking region than the frames from the display interface.

FIG. 2 depicts alignment of frames from a source with frames from a frame buffer where the frames from the frame buffer have a longer vertical blanking region than the frames from the display interface. In the table above, this scenario is labeled "TCON lags." When signal SRD_ON goes to the inactive state, the frame buffer is reading out a frame. The next frames from the display interface, F1 and F2, are written into the frame buffer and also read out from the frame buffer for display. Because the vertical blanking interval for the frame provided from the source (e.g., display interface) is less than the vertical blanking interval of frames from the frame buffer, the frames from the frame buffer gain N lines relative to each frame from the source each frame period.

In the circled region, the beginning of the blanking regions of the source frame and the frame buffer frame are within a window of each other. That event triggers the signal SRD_STATUS to transition to inactive state. At the next rising edge of signal SOURCE_VDE, the MUX outputs frame F4 from the graphics engine.

The aforementioned window can start at a delay from the falling edge of TCON_VDE so that the minimum vertical blank specification of the display is not violated for the TCON frame. The window can become inactive after some delay from becoming active that achieves (1) a maximum vertical blank specification of the display not being violated for the TCON frame while maintaining display quality and (2) reading of a frame from the frame buffer has not started yet.

One consequence of alignment is that a frame F3 from the frame buffer is skipped and not displayed even though it is stored in the frame buffer.

For the example of FIG. 2, the maximum time to achieve lock can be $V_T/N$, where $V_T$ is the source frame size and N is the difference in number of lines (or in terms of time) between vertical blanking regions of a frame from the graphics engine and a frame from the frame buffer. The minimum lock time can be 0 frames if the first SOURCE_VDE happens to align with TCON_VDE when SRD_ON becomes inactive.

Figure 3:
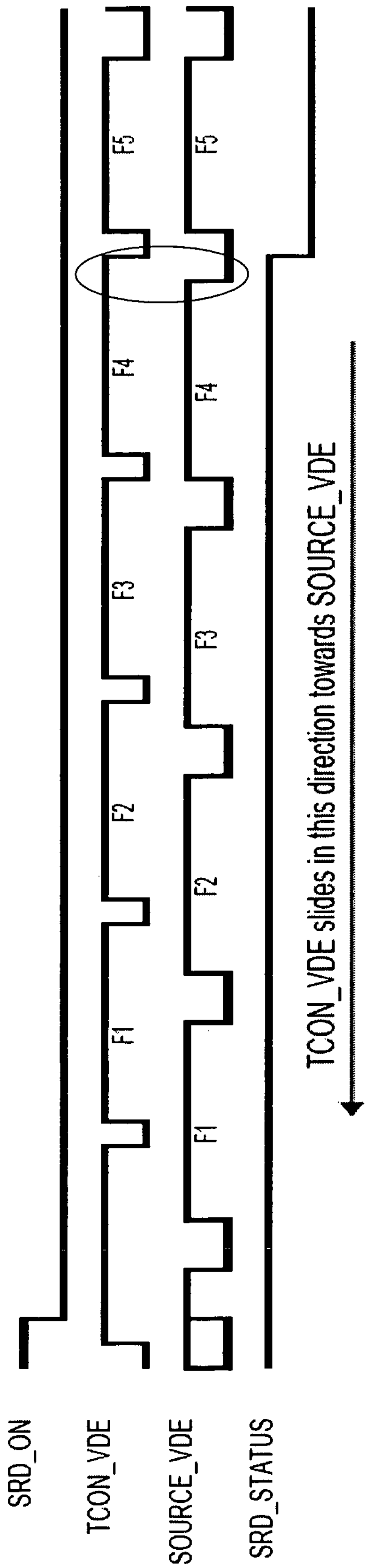
FIG. 3 depicts alignment of frames from a source with frames from a frame buffer where the frames from the frame buffer have a shorter vertical blanking region than the frames from the source.

FIG. 3 depicts alignment of frames from a source with frames from a frame buffer where the frames from the frame buffer have a shorter vertical blanking region than the frames from the source. In the table above, this scenario is labeled "TCON leads." Because the vertical blanking interval for the frame provided from the frame buffer is less than the vertical blanking interval of frames from the source (e.g., display interface), the frames from the source gain N lines relative to each frame from the frame buffer each frame period. As with the example of FIG. 2, after signal SRD_ON goes inactive, frames from the source are stored into the frame buffer and read out from the frame buffer until the beginning of the vertical blanking regions of a source frame and a frame buffer frame are within a window of each other.

In the circled region, the beginning of the vertical blanking regions of the source frame and the frame buffer frame are within a window of each other. That event triggers signal SRD_STATUS to transition to inactive state. At the next rising edge of signal SOURCE_VDE, the display outputs the source frame as opposed to the frame from the frame buffer. In this example, no frames are skipped because all frames from the display interface that are stored in the frame buffer after signal SRD_ON goes inactive are read out to the display.

For example, the window can start at a time before the falling edge of TCON_VDE that achieves a minimum vertical blank specification of the display not being violated for the TCON frame and can become inactive after some delay from becoming active that achieves (1) a maximum vertical blank specification of the display not being violated for the TCON and (2) reading of the frame from the frame buffer has not started yet.

For the example of FIG. 3, a maximum lock time is $V_T/N$, where $V_T$ is the source frame size and N is the difference in number of lines or time between vertical blanking regions of a source buffer frame and frames from a frame buffer. A minimum lock time can be 0 frames if the first frame of SOURCE_VDE happens to align with TCON_VDE when SRD_ON becomes inactive.

In yet another embodiment, a lead or lag alignment mode of respective FIG. 2 or 3 can be used to determine when to output for display a frame from a graphics engine instead of from a frame buffer. In the table above, this scenario is labeled "Adaptive ICON sync." Immediately after SRD_ON goes to an inactive state to indicate to display the display interface data, vertical blanks of the source and display interface frames are inspected.

The timing controller or other logic determines a threshold value, P, that can be used to compare a SOURCE_VDE offset measured after signal SRD_ON goes to an inactive state. SOURCE_VDE offset can be measured between a first falling edge of a vertical blank of a frame buffer frame and a first falling edge of vertical blank of a source frame. Value P can be determined using the following equation:

$$P=N1*V_T/(N1+N2),\text{ where}$$

N1 and N2 are manufacturer specified values and $V_T$ represents a source frame time (length).

The timing controller is programmed with N1 and N2 values, where N1 represents a programmed limit by which a frame from the frame buffer lags a frame from the display engine and N2 represents a programmed limit by which a frame buffer frame leads a frame from a graphics engine.

A determination of whether to use lag or lead alignment techniques can be made using the following decision:

if initial SOURCE_VDE offset <=P, use lag technique (FIG. 2) or if initial SOURCE_VDE offset>P, use lead technique (FIG. 3).

For most panels, N2 <<N1, so the max lock time becomes larger than $V_T/2N$.

Figure 4:
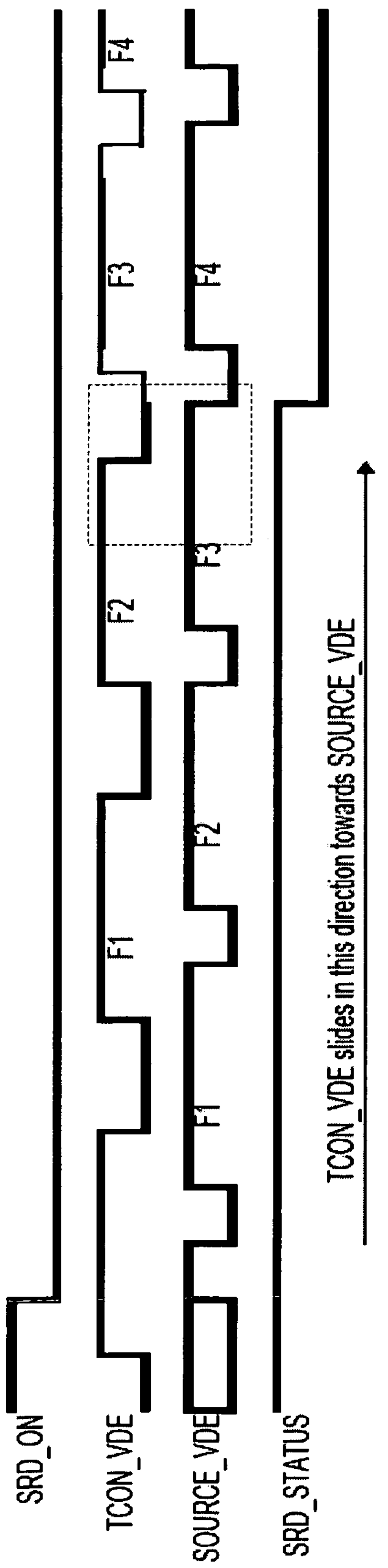
FIG. 4 depicts alignment of frames from a frame buffer with frames from a source.

FIG. 4 depicts alignment of frames from a frame buffer with frames from a source. In the table above, this scenario is labeled "Continuous Capture." In this embodiment, source frames are written into the frame buffer (SOURCE_VDE) and frames are also read out of the frame buffer (TCON_VDE) even after alignment has occurred. Before the alignment, the vertical blanking interval for the frames from the frame buffer is longer than the vertical blanking interval for the frames from the source. In an alternative embodiment, the vertical blanking region of the frames from the frame buffer can exceed that of the source frames by N lines.

When SRD_ON becomes inactive, frames from the display interface are written to the frame buffer but data for the display continues to be read from the frame buffer. In this way each frame from the display interface is first written to the frame buffer then read from the frame buffer and sent to the display. In the dotted square region, the beginning of the blanking regions of the source frame and the frame buffer frame are within a window of each other.

The beginning of the blanking region for the source frame (i.e., signal SOURCE_VDE going to the inactive state) triggers the SRD_STATUS to go inactive. Frames continue to be read from the frame buffer but the vertical blanking region after the very next active state of signal TCON_VDE is set to match the vertical blanking region of the source frame SOURCE_VDE.

For example, in the case where the TCON lags based continuous capture, the window can start at some delay after the falling edge of TCON_VDE so that the minimum vertical blank specification of the display is not violated for the TCON frame, and the window can become inactive after some delay from becoming active that achieves the maximum vertical blank specification of the display not being violated for the TCON frame, while maintaining display quality. The window is also constructed so that some minimum phase difference is maintained between TCON_VDE and SOURCE_VDE.

The maximum time to achieve lock can be $V_T/N$, where $V_T$ is the source frame size and N is the difference in number of lines between vertical blanking regions of a source buffer frame and frame buffer frame. The minimum lock time can be 0 frame if the first SOURCE_VDE happens to align with TCON_VDE.

Figure 5:
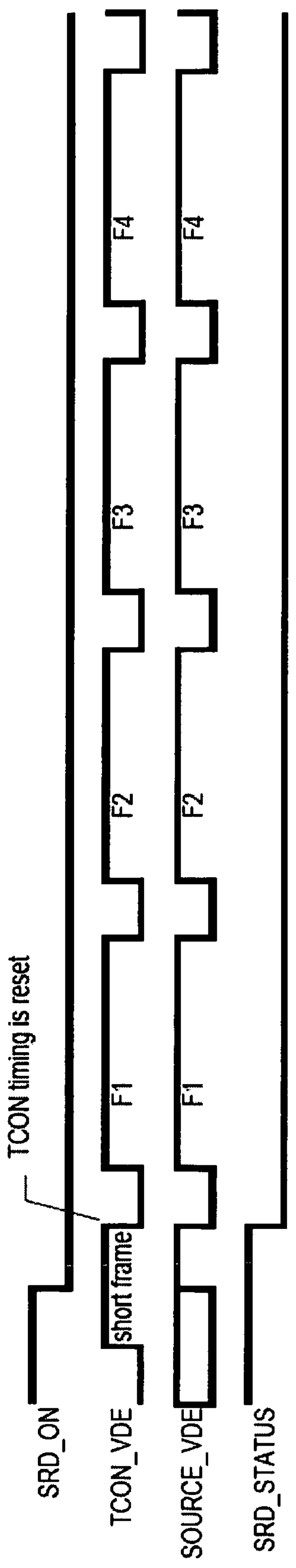
FIG. 5 depicts a scenario in which frames from the source are sent to the display immediately after a first falling edge of the source frame signal SOURCE_VDE after SRD_ON becomes inactive.

FIG. 5 depicts a scenario in which frames from the source are sent to the display immediately after a first falling edge of the source frame signal SOURCE_VDE after SRD_ON becomes inactive. In the table above, this scenario is labeled "TCON Reset." One possible scenario is a frame from the data buffer may not have been completely read out for display at a first falling edge of the source frame signal SOURCE_VDE. The frame read out during a first falling edge of the source frame signal SOURCE_VDE is depicted as "short frame." A short frame represents that an entire frame from the frame buffer was not read out for display. For example, if a first half of the pixels in a frame are displayed, the second half that is displayed is the second half from the frame buffer that was sent previously. The display of the second half may be decaying and so image degradation on the second half may be visible.

When the first source frame signal SOURCE_VDE transitions to inactive during a vertical blanking region of TCON_VDE, short frames may not occur.

In this scenario the maximum time to achieve lock can be zero. However, visual artifacts may result from short frames.

Figure 6A:
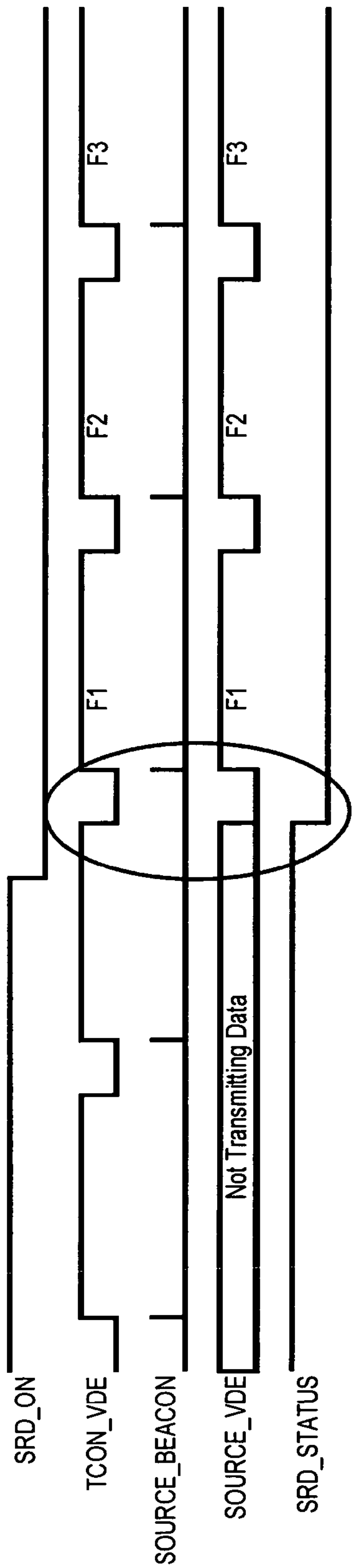
FIGS. 6A and 6B depict use of source beacon signals to achieve synchronization.
Figure 6B:
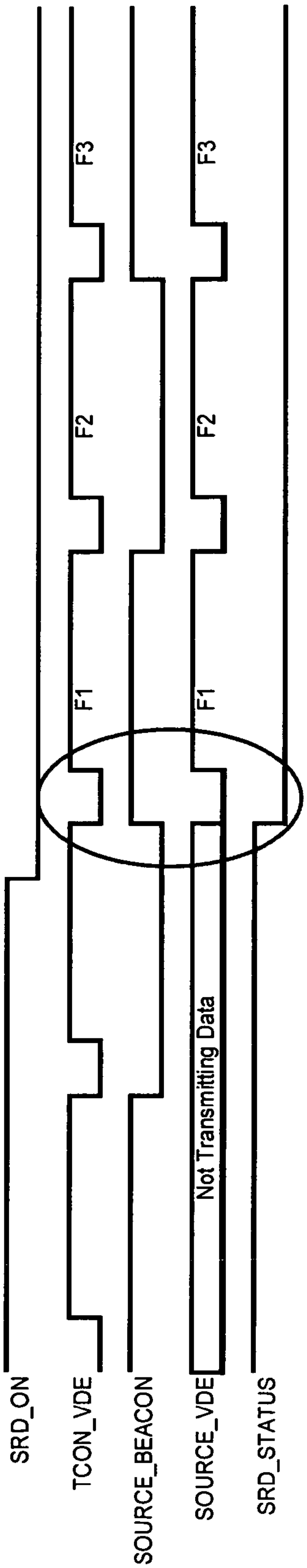

FIGS. 6A and 6B depict examples in which a source periodically provides a synchronization signal to maintain synchronization between frames from the frame buffer and frames from the source. In the table above, this scenario is labeled "Source Beacon." In FIG. 6A, signal SOURCE_BEACON indicates the end of a vertical blanking region whereas in FIG. 6B, a rising or falling edge of signal SOURCE_BEACON indicates the start of a vertical blanking region. Signal SOURCE_BEACON can take various forms and can indicate any timing point. Timing generator logic can use the SOURCE_BEACON signal to maintain synchronization of frames even when the display displays frames from a frame buffer instead of from a source. Accordingly, when the display changes from displaying frames from a frame buffer to displaying from a source, the frames are in synchronization and display of frames from the display interface can take place on the very next frame from the source.

Figure 7:
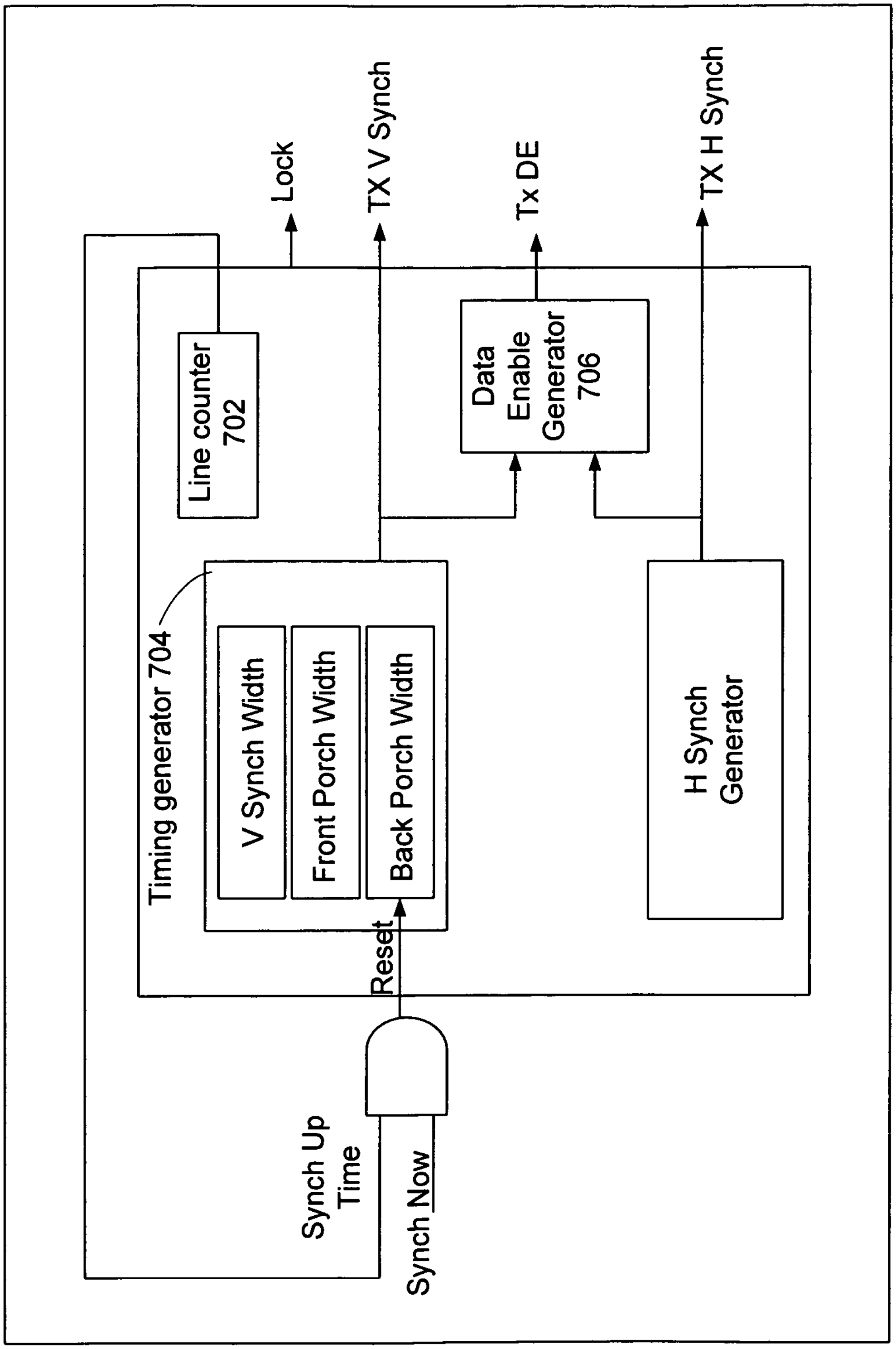
FIG. 7 depicts an example system that can be used to vary the vertical blanking interval in order to align frames from a frame buffer and frames from a graphics engine, display interface, or other source.

FIG. 7 depicts an example system that can be used to vary the vertical blanking interval in order to align frames from a frame buffer and frames from a graphics engine, display interface, or other source. The system of FIG. 7 can be implemented as part of the timing generator and timing synchronizer of FIG. 1. This system is used to control reading from the frame buffer and to transition from reading a frame from a frame buffer repeatedly to reading frames from a graphics engine, display interface, or other source written into the frame buffer.

The system of FIG. 7 can be used to determine whether the beginning of active states of a frame from a frame buffer and a frame from a source such as a display interface occur within a permissible time region of each other. If the active states of a frame from a frame buffer and a frame from a source occur within a permissible time region of each other, then the frames from the source can be output for display. In a lag scenario (TCON VBI is greater than source VBI), the system of FIG. 7 can be used to determine when to output a frame from a display interface. The system of FIG. 7 can be used whether streaming or continuous capture of frames from the display interface occurs.

In some embodiments, the refresh rate of a panel can be slowed and extra lines can be added during the vertical blanking interval of the frames read out of the frame buffer. For example, if a refresh rate is typically 60 Hz, the refresh rate can be slowed to 57 Hz or other rates. Accordingly, additional pixel lines worth of time can be added to the vertical blanking interval.

Line counter 702 counts the number of lines in a frame being read from the frame buffer and sent to the display. After a predefined number of lines are counted, line counter 702 changes signal Synch Up Time to the active state. Signal Synch Up Time can correspond to the timing window, mentioned earlier, within which synchronization can occur. Signal Synch Now is generated from signal SOURCE_VDE and indicates a time point within the source frame where synchronization can occur. When signal Synch Now enters the active state when signal Synch Up Time is already in the active state, line counter 702 resets its line count. Resetting the line counter reduces the vertical blanking interval of frames from a frame buffer and causes the frames from the frame buffer to be provided at approximately the same time as frames from a graphics engine (or other source). In particular, parameter Back Porch Width is varied to reduce the vertical blanking interval of frames based on where reset of the line counter occurs.

The V synch width, Front Porch Width, and Back Porch Width parameters are based on a particular line count or elapsed time.

Figure 8:
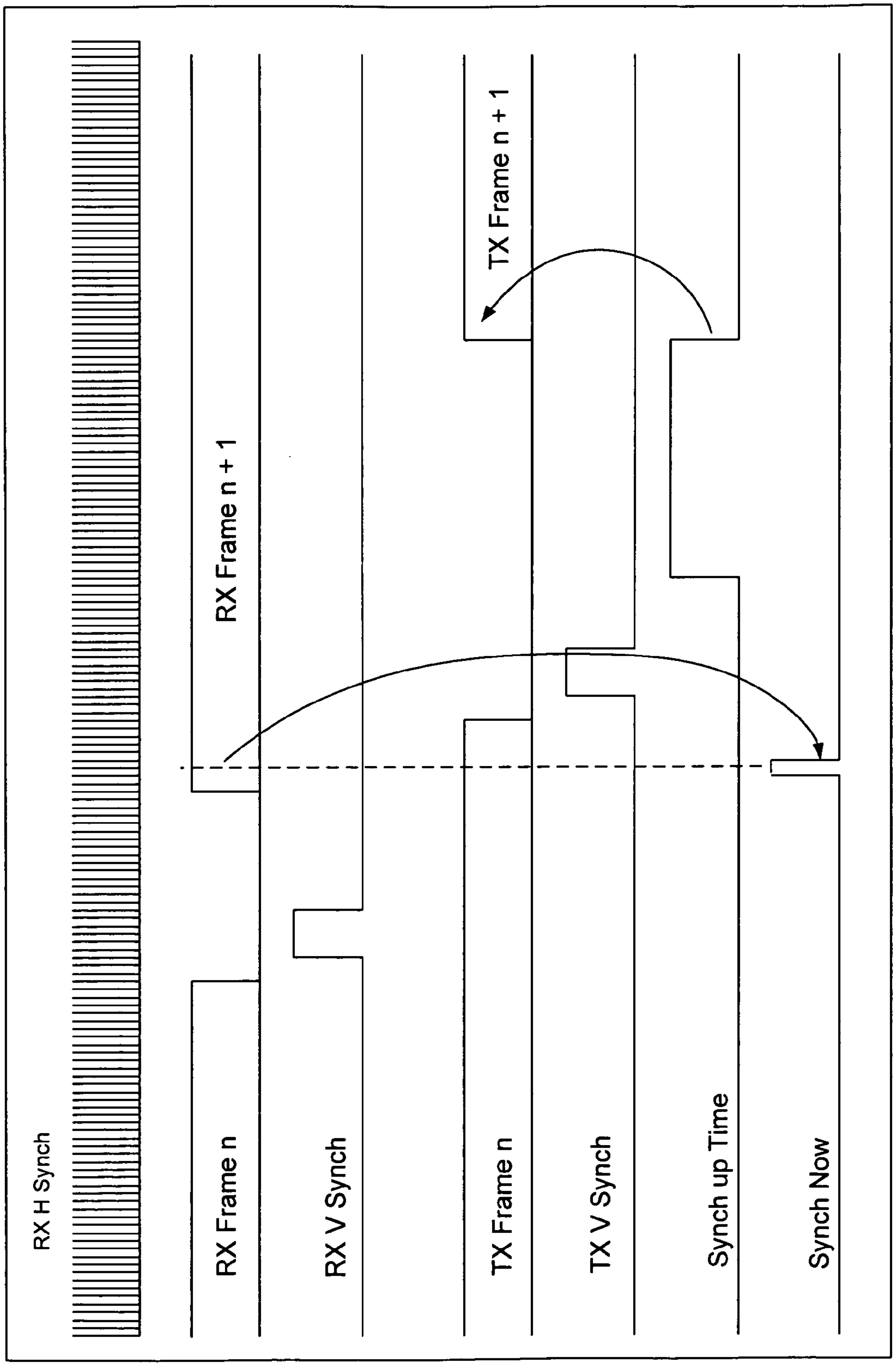
FIG. 8 depicts a scenario where frames from a frame buffer are not aligned with frames from a graphics engine.
Figure 9:
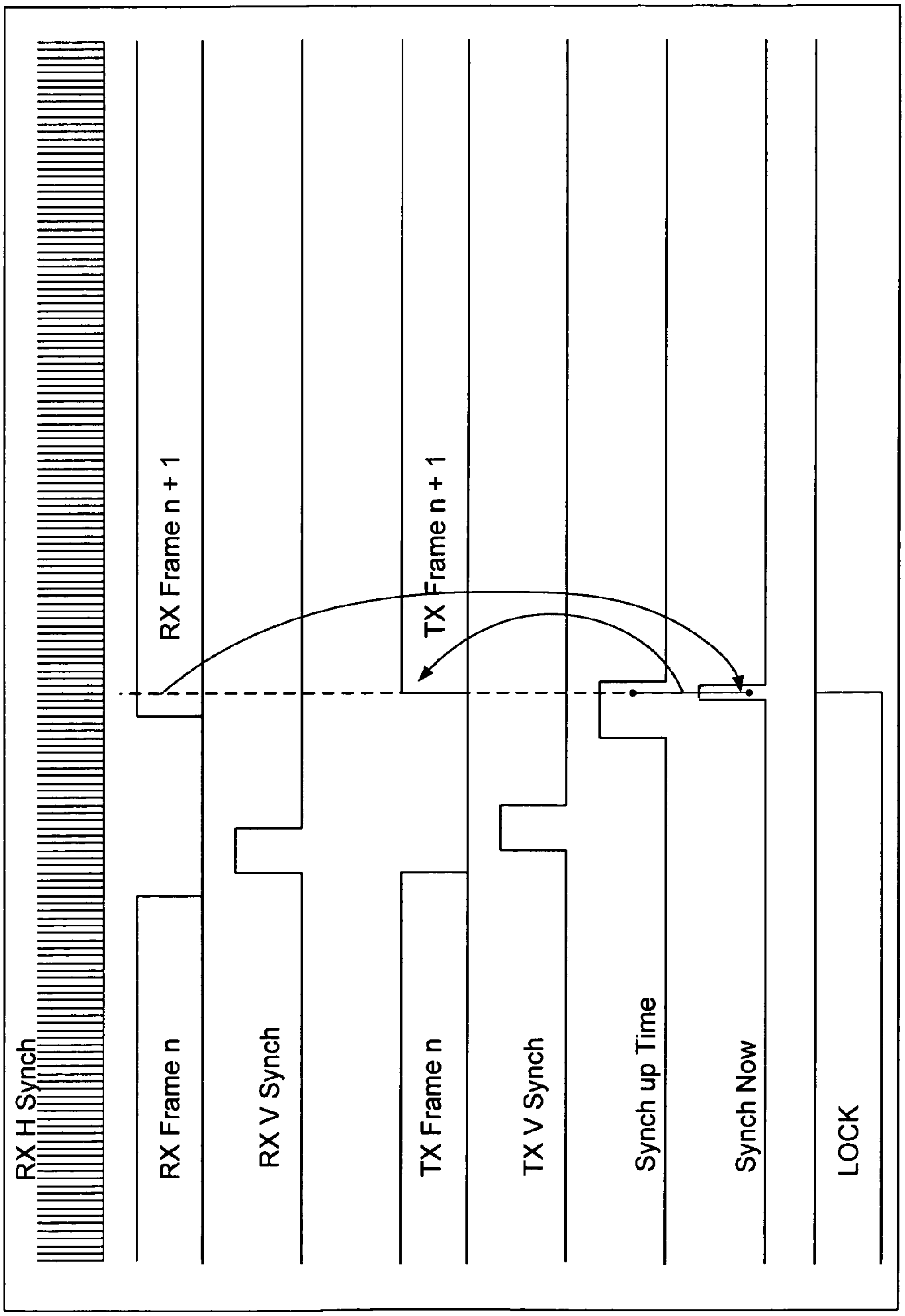
FIG. 9 depicts an example in which a transition of signal RX Frame n+1 to active state occurs within the Synch Up Time window of when signal TX Frame n+1 transitions to an active state.

Operation of the system of FIG. 7 is illustrated with regard to FIGS. 8 and 9. FIG. 8 depicts a scenario where the system has not synchronized the frames from a frame buffer with frames from a graphics engine or other source yet. FIG. 9 depicts a scenario where the system has synchronized the frames from a frame buffer with frames from a graphics engine or other source.

Referring first to FIG. 8, signal RX Frame n in the active state represents availability of data from a display interface to be written into the frame buffer. In response to signal RX Frame n transitioning to the inactive state, signal RX V Synch toggles to reset the write pointer to the first pixel in the frame buffer. When signal TX Frame n is in an active state, a frame is read from a frame buffer for display. In response to signal TX Frame n going inactive, signal TX V Synch toggles in order to reset the read pointer to the beginning of a frame buffer. A front porch window is a time between when completion of reading TX Frame n and the start of an active state of signal TX V Synch.

Timing generator 704 (FIG. 7) generates signal TX V Synch, TX DE and TX H Synch signals. The signal Reset is used to set the leading edge of DE timing to any desired start point. This is used to synchronize the TX timing to RX timings.

In this example implementation, the signal Synch Now transitions to the active state after writing of the first line of RX Frame n+1 into the frame buffer. In general, signal Synch Now can be used to indicate writing of lines other than the first line of an RX Frame. Signal Synch Up Time changes to active after line counter 702 counts an elapse of a combined active portion of a TX frame and minimum vertical back porch time for the TX frame. Signal Synch Up Time goes inactive when the vertical blanking interval of TX frame expires or the reset signal clears the line counter. Signal Synch Up Time going inactive causes reading of TX Frame n+1. However, signal Synch Now enters the active state when signal Synch up Time is not already in the active state. Accordingly, the vertical blanking time of signal TX Frame n+1 is not shortened to attempt to cause alignment with signal RX Frame n+1.

For example, for a 1280×800 pixel resolution screen, signal Synch Up Time transitions to active state when line counter 702 (FIG. 7) detects 821 horizontal lines have been counted. Counting of 821 lines represents elapse of a combined active portion of a frame and minimum backporch time for a TX frame.

Signal TX Data enable (signal TX DE in FIG. 7) generator 706 generates the data enable signal (TX DE) during the next pixel clock. This causes TX Frame n+1 to be read from the beginning of the frame buffer.

FIG. 9 depicts an example in which a transition of signal RX Frame n+1 to active state occurs within the Synch Up Time window just before the signal TX Frame n+1 transitions to an active state. Signal Synch Now is generated after the end of the writing of the first line (or other line) of RX Frame n+1 to the frame buffer. This causes the frame read pointer to lag behind the frame write pointer. When signal Synch Now enters the active state when signal Synch Up Time is already in the active state, signal Reset (FIG. 7) is placed into an active state. The signal Reset going to an active state causes timing generator 704 to truncate the vertical blanking interval by causing reading out of a received frame TX Frame n+1 from the frame buffer approximately one line behind the writing of frame RX Frame n+1 into the frame buffer. In other embodiments, more than one line difference can be implemented. This causes the frame read pointer to lag behind the frame write pointer. In addition, when signal Synch Now enters the active state when signal Synch Up Time is already in the active state, signal LOCK changes from the inactive to the active state, indicating that TX Frame is now locked to RX Frame. After synchronization, as with the continuous capture case, a vertical blanking interval time of frames from the frame buffer (TX frames) will be equal to the vertical blanking interval time of frames from the display interface (RX frames) due to the Reset signal happening every frame after the LOCK signal goes active.

The system of FIG. 7 can be used to synchronize frames from a frame buffer with frames from a source such as a display interface in a lead scenario where TCON VBI is smaller than source VBI. The VBI of frames from the TCON frame buffer can be increased to a maximum VBI for that frame when the synchronization point is within the window and the switch takes place before the rising edge of the next SOURCE_VDE. Alternatively, when the synchronization point is within the window, a switch takes place at the synchronization point.

Figure 10:
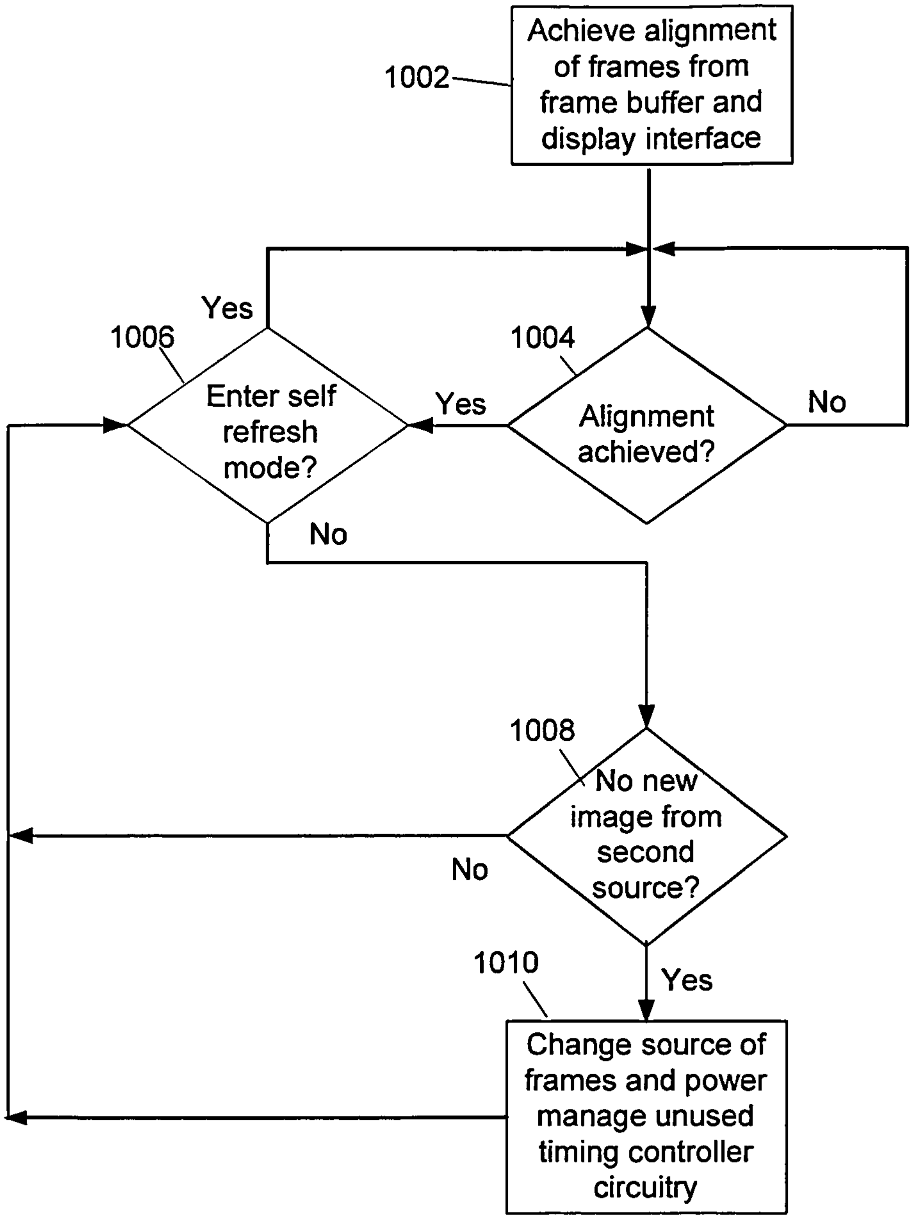
FIG. 10 depicts an example flow diagram of a process that can be used to determine when to switch from displaying a frame from a first source and displaying a frame from a second source.

FIG. 10 depicts an example flow diagram of a process that can be used to determine when to switch from displaying a frame from a first source and displaying a frame from a second source. The first source can be a frame buffer whereas the second source can be a display interface that receives frames from a graphics engine. The process of FIG. 10 can be performed by a host system as opposed to the TCON.

Box 1002 includes performing alignment of frames from different sources. For example techniques described earlier can be used to determine when to provide display of frames from a second source. Alignment can occur under a variety of conditions. For example, if an end of a frame from the first source can occur within a time window of an end of a frame from the second source, then at a next beginning of a frame from the second source, the frame from the second source can be provided for display. In another scenario, frames from the first and second sources are stored into the frame buffer and when an end of a frame from the first source can occur within a time window of an end of a frame from the second source, then after a next frame from the first source, the vertical blanking interval between frames from the first source is set to match that of the second source. In yet another scenario, regardless of whether an entire frame from a first source has completely been provided for display, vertical blanking interval and a frame from a second source is output immediately.

Block 1004 includes determining whether alignment was achieved. If alignment was achieved, block 1006 follows block 1004. If alignment was not achieved, block 1004 follows block 1006. A display driver running on a processor can read a status register associated with the display panel to determine whether timing alignment has occurred. The status register can be located in memory of the display panel or in memory of the host system. If the DisplayPort specification is used as an interface to the panel, the status register can be located in the memory of the display panel.

Block 1006 includes determining whether to re-enter self refresh display mode. Self refresh display mode can involve displaying an image from a frame buffer repeatedly. Self refresh display mode can be used when another source of video is disconnected or provides a static image. Techniques described with regard to U.S. patent application Ser. No. 12/313,257, entitled "TECHNIQUES TO CONTROL SELF REFRESH DISPLAY FUNCTIONALITY," filed Nov. 18, 2008 can be used to determine whether to enter self refresh display mode. After block 1006, block 1004 is performed.

In some implementations, although not depicted, between blocks 1006 and 1008, a check can occur of whether alignment still maintained. The check can be performed by determining whether a start of a vertical blanking region of a frame from the first source is within a time window of a start of a vertical blanking region of a frame from the second source. The check can include determining whether vertical blanking regions of frames from the first and second sources are approximately equal in length. Other checks can be performed of whether conditions that led to alignment in block 1002 are still present.

Frames from a second source are stored into a first source and output for display. For example, frames from a display interface are stored into a frame buffer and read out from the frame buffer according to the timing of the timing controller for the frame buffer. However, when switching from outputting frames from the frame buffer to outputting frames from the display interface, the content of frames from the display interface can be markedly different from those output from the frame buffer. Block 1008 can be used to avoid visible glitches when switching from displaying a frame from a first source to displaying frames from a second source even though alignment is achieved. As stated earlier, alignment of frames from the first and second sources can help to avoid visible discontinuities when changing from display of frames from a first source to frames from a second source. Block 1008 evaluates whether one or more frames from the second source that would be provided after permitting direct output from the second source (instead of from the first source) are similar to images from the first source. Accordingly, a visible glitch or abrupt change in scene can be avoided when switching to direct output from the second source if the one or more frames from the second source are similar to one or more frames output from the first source. Referring to FIG. 1, MUX 104 switches from outputting frames from the second source directly.

Referring again to FIG. 10, block 1008 includes determining whether any new image is available from the second source. A variety of manners of determining whether a new image is available from the second source. For example, a graphics engine can use a back buffer to store image content currently processed by the graphics engine and also use a front buffer to store image content that is available for display. The graphics engine can change a designation of a back buffer to a front buffer after an image is available to display and change a designation of the front buffer to back buffer. When the graphics engine changes the designation, then a front buffer update has occurred and a new image is available for display. If no front buffer update has occurred, then an image from the display interface is considered similar to the image in the frame buffer. So in some cases, the changing of a designation indicates a new image has been rendered by the graphics engine.

In some cases, block 1008 includes a modified graphics driver trapping any instructions that request image processing. The graphics driver can be an intermediary between an operating system and a graphics processing unit. The driver can be modified to trap certain active commands such as a draw rectangle command or other command that instructs rendering of another image. Trapping an instruction can include the graphics driver identifying certain functions calls and indicating in register that certain functions were called. If the register is empty, then no new image is provided by the second source and an image from the display interface is considered similar to the image in the frame buffer.

In some cases, block 1008 includes graphics processing hardware using a command queue where micro level instructions that are stored to execute image rendering. If the queue is empty, then no new image is provided by the second source and an image from the display interface is considered similar to the image in the frame buffer.

In some cases, block 1008 includes a graphics processing unit writing results of processed images into an address range in memory. The graphics driver or other logic can determine whether any writes have been made into the address range. If no writes have occurred, then no new image is provided by the second source and an image from the display interface is considered similar to the image in the frame buffer.

In some cases, block 1008 includes a graphics driver instructing a central processing unit or executing general purpose computing commands of a graphics processing unit to compare a frame from the first source with a frame from the second source region by region. The determination can be made of whether a new frame is available from the second source based on the comparison. Accordingly, an evaluation takes place of how different the frame immediately output from the frame buffer (frame 1) is from the frame from the display interface (frame 2) that would immediately follow frame 1. If frame 1 and frame 2 are similar, an image from the display interface is considered similar to the image in the frame buffer.

The determination of whether of a new image has been rendered by the graphics engine can be an immediate decision or could be made based on examination of conditions over a time window. For example, the time window can be a width of a vertical blanking interval.

If a new image is available from the second source, then block 1006 follows block 1008. If a new image is not available from the second source, then block 1010 follows block 1008. Block 1010 can follow block 1008 to allow output of a frame from the second source instead of from the first source.

Block 1010 includes switching display of frames from a first source to a second source. In some cases, a multiplexer (MUX) of a timing controller (e.g., MUX 104 of FIG. 1) is configured to permit output of frames from the second source. The frames from the second source can be written into a frame buffer and read from the frame buffer until both timing alignment is met and an image that is to be displayed from the second source is similar to that immediately read out from the frame buffer.

In some cases, a dedicated control line driven by the graphics engine can cause the MUX to switch outputting frames from the first source or the second source or vice versa. The control line could be a wire.

In same cases, a graphics engine can transmit a message over the AUX channel or a secondary data packet of a DisplayPort interface to command the display to switch outputting frames from the first source or the second source or vice versa.

In addition, block 1010 permits powering down of the frame buffer and clock gating (i.e., not providing a clock signal) to clock related circuitry such as phase lock loops and flip flops. Power gating (i.e., removing bias voltages and currents) from timing synchronizer, memory controller and arbiter, timing generator 110, write address and control, read address and control, write FIFO and rate converter, and read FIFO and rate converter 108 (FIG. 1).

Figure 11:
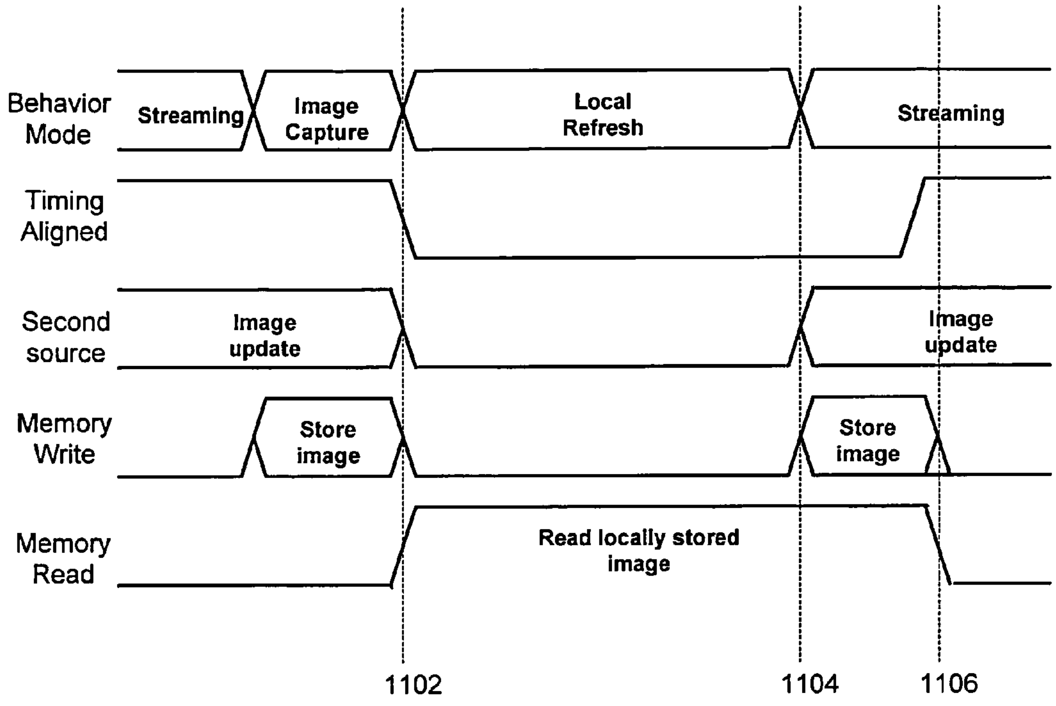
FIG. 11 depicts an example of timing signals and states involved in transitioning from local refresh to streaming modes.

FIG. 11 depicts an example of timing signals and states involved in transitioning from local refresh to streaming modes. At 1102, a second source temporarily ceases to update images for display. Consequently, a behavior mode of local refresh is entered. Local refresh can include displaying an image stored locally in a frame buffer repeatedly. “Timing Aligned” going inactive indicates that the timing of the display device is used to generate the local image as opposed to the timing of the second source. Prior to entering local refresh, “Memory Write” indicates that the images from the first source are stored into the frame buffer. After entering local refresh, the frame buffer is not written into. After 1102, “Memory Read” indicates that a locally stored image in frame buffer is read out for display.

At 1104, the behavior mode of local refresh is exited and streaming mode is entered because second source provides an updated image. Memory Write indicates that the frame buffer stores an image from the second source. Memory Read indicates that locally stored image in a frame buffer are read out and displayed. After entering streaming mode, images from the second source are stored into the frame buffer and read out from the frame buffer according to the timing of the display device as opposed to the timing of the second source.

At 1106, frames from the second source are output directly for display and the frame buffer is not used to output frames for display. Timing Aligned going active indicates that alignment occurs between the edges of frames output from a first source (i.e., frame buffer) and frames output from the second source. In addition, based on block 1008 (FIG. 10), images read from the frame buffer are similar to images from the second source. Accordingly, a visible glitch or abrupt change may not be visible when switching to direct output from the second source. Memory Write indicates that the frame buffer ceases to store frames from the second source. Memory Read indicates no further reading from the frame buffer.

Figure 12:
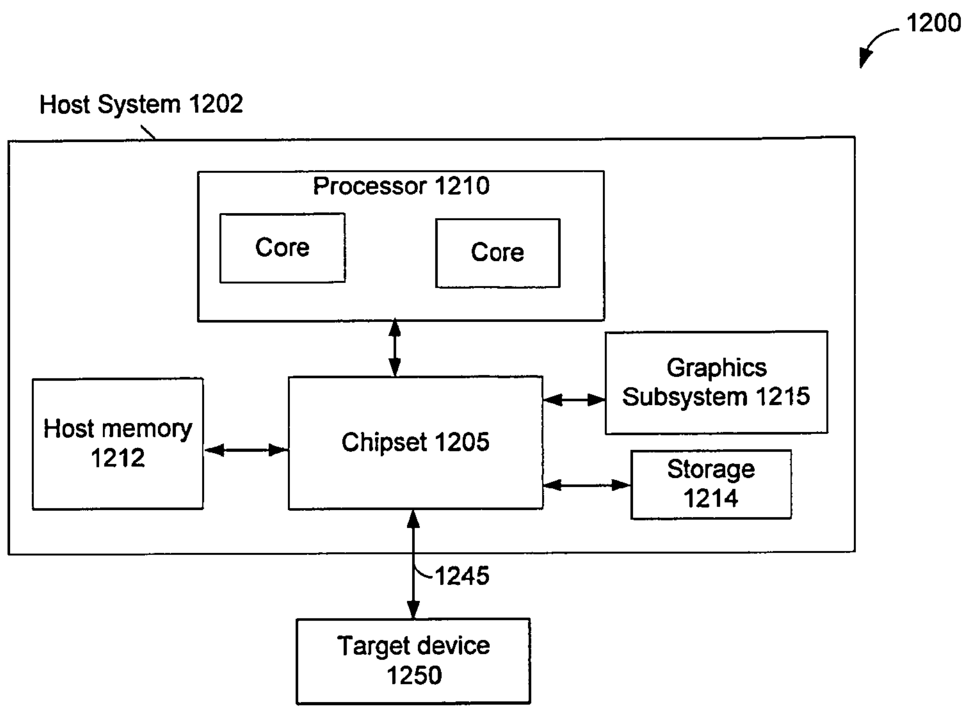
FIG. 12 depicts a system in accordance with an embodiment.

FIG. 12 depicts a system 1200 in accordance with an embodiment. System 1200 may include a source device such as a host system 1202 and a target device 1250. Host system 1202 may include a processor 1210 with multiple cores, host memory 1212, storage 1214, and graphics subsystem 1215. Chipset 1205 may communicatively couple devices in host system 1202. Graphics subsystem 1215 may process video and audio. Host system 1202 may also include one or more antennae and a wireless network interface coupled to the one or more antennae (not depicted) or a wired network interface (not depicted) for communication with other devices.

In some embodiments, processor 1210 can decide when to power down the frame buffer of target device 1250 at least in a manner described with respect to co-pending U.S. patent application Ser. No. 12/313,257, entitled "TECHNIQUES TO CONTROL SELF REFRESH DISPLAY FUNCTIONALITY," filed Nov. 18, 2008.

For example, host system 1202 may transmit commands to capture an image and power down components to target device 1250 using extension packets transmitted using interface 1245. Interface 1245 may include a Main Link and an AUX channel, both described in Video Electronics Standards Association (VESA) DisplayPort Standard, Version 1, Revision 1a (2008). In various embodiments, host system 1202 (e.g., graphics subsystem 1215) may form and transmit communications to target device 1250 at least in a manner described with respect to co-pending U.S. patent application Ser. No. 12/286,192, entitled "PROTOCOL EXTENSIONS IN A DISPLAY PORT COMPATIBLE INTERFACE," filed Sep. 29, 2008.

Target device 1250 may be a display device with capabilities to display visual content and broadcast audio content. Target device 1250 may include the system of FIG. 1 to display frames from a frame buffer or other source. For example, target device 1250 may include control logic such as a timing controller (ICON) that controls writing of pixels as well as a register that directs operation of target device 1250.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device such as a handheld computer or mobile telephone with a display.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method comprising:

determining whether frames from a first source are timing aligned with frames from a second source, wherein frames from a first source are timing aligned with frames from a second source in response to an edge of a frame from the first source and a same type of edge of a frame from the second source are both within a window;

writing frames from the second source into the first source;

providing frames from the first source for display;

determining whether a frame from the first source is similar to a frame from the second source; and selectively permitting display of frames from the second source instead of permitting display of frames from the first source in response to a determination that a frame from the first source is similar to a frame from the second source and alignment of frames from the first source with frames from the second source, wherein the determining whether a frame from the first source is similar to a frame from the second source comprises at least trapping selected active draw or rendering commands and indicating in a register that one or more of the selected commands were called and wherein when the register is empty, there is a determination that the frame from the first source is similar to the frame from the second source.

2. The method of claim 1, wherein the first source comprises a frame buffer of a display and the second source comprises a display interface.

3. The method of claim 1, wherein the determining whether a frame from the first source is similar to a frame from the second source additionally comprises:

determining whether any graphics engine buffer update has occurred after alignment of frames from the first source with frames from the second source, wherein in response to a determination that no buffer update has occurred after alignment of frames, the frame from the first source is determined to be similar to the frame from the second source.

4. The method of claim 1, wherein the determining whether a frame from the first source is similar to a frame from the second source additionally comprises:

determining whether writing of any image to an address block in memory occurred after alignment of frames from the first source with frames from the second source, wherein in response to a determination of writing of an image to the address block after alignment of frames, the frame from the first source is determined to be similar to the frame from the second source.

5. The method of claim 1, wherein the determining whether a frame from the first source is similar to a frame from the second source occurs during a vertical or horizontal blanking interval of frames from the first source.

6. The method of claim 1, wherein the determining whether a frame from the first source is similar to a frame from the second source occurs in a display device.

7. The method of claim 1, wherein the determining whether a frame from the first source is similar to a frame from the second source occurs in a graphics engine.

8. The method of claim 1, wherein determining whether frames from a first source are aligned with frames from a second source comprises determining whether a start of a vertical blanking interval of a frame from the first source is within a window of a vertical blanking interval of a frame from the second source.

9. The method of claim 1, wherein the determining whether a frame from the first source is similar to a frame from the second source comprises:

determining whether a command queue that stores image rendering commands is empty, wherein when a determination that command queue that stores image rendering commands is empty, there is a determination that the frame from the first source is similar to the frame from the second source.

10. A system comprising:

a host system comprising a graphics engine and a memory;

a frame buffer;

a display communicatively coupled to the frame buffer;

a display interface to communicatively couple the graphics engine to the display;

logic to determine whether frames from the frame buffer are aligned with frames from the graphics engine, wherein frames from the frame buffer are timing aligned with frames from the graphics engine in response to an edge of a frame from the frame buffer and a same type of edge of a frame from the graphics engine are both within a window;

logic to write frames from the graphics engine into the frame buffer;

logic to provide frames from the frame buffer for display;

logic to determine whether a frame from the frame buffer is similar to a frame from the graphics engine; and logic to selectively permit display of frames from the graphics engine instead of display of frames from the frame buffer in response to a determination that a frame from the frame buffer is similar to a frame from the graphics engine and alignment of frames from the frame buffer with frames from the graphics engine, wherein the logic to determine whether a frame from the frame buffer is similar to a frame from the graphics engine is to at least trap one or more selected active draw or rendering commands and provide an indication in a register of the calling of one or more selected commands and wherein when the register is empty, there is a determination that the frame from the frame buffer is similar to the frame from the graphics engine.

11. The system of claim 10, wherein the display interface is compatible with DisplayPort specification Version 1, Revision 1a (2008).

12. The system of claim 10, wherein the display interface comprises a wireless network interface.

13. The system of claim 10, wherein the logic to determine whether a frame from the frame buffer is similar to a frame from the graphics engine is to additionally determine whether any graphics engine buffer update has occurred after alignment of frames from the graphics engine with frames from the frame buffer.

14. The system of claim 10, wherein the logic to determine whether a frame from the frame buffer is similar to a frame from the graphics engine is to additionally determine whether writing of any image to an address block in memory occurred after alignment of frames from the graphics engine with frames from the frame buffer.

15. The system of claim 10, further comprising:

a wireless network interface communicatively coupled to the host system and to receive video and store video into the memory.

16. The system of claim 10, wherein the display includes the logic to selectively permit display of frames from the graphics engine.

17. The system of claim 10, wherein the host system includes the logic to selectively permit display of frames from the graphics engine.

18. The system of claim 10, wherein the logic to determine whether a frame from the frame buffer is similar to a frame from the graphics engine is to additionally determine whether a command queue that stores image rendering commands is empty.

* * * * *